April 14, 1953  O. FIRING  2,634,485
AUTOMATIC LOCK SLIDER
Filed Jan. 19, 1950  2 SHEETS—SHEET 1
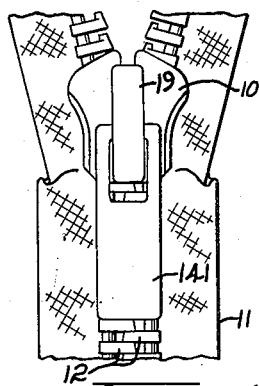
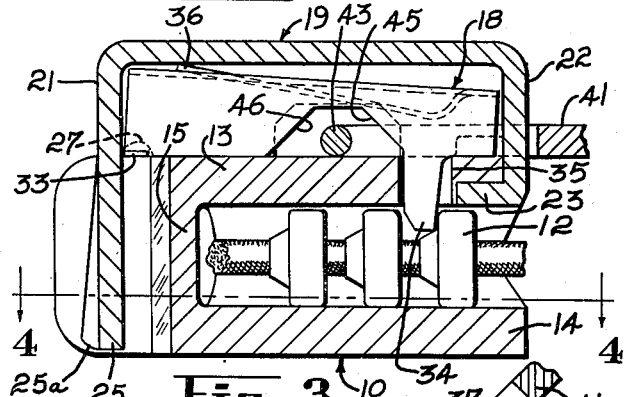
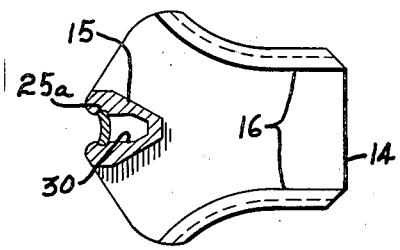
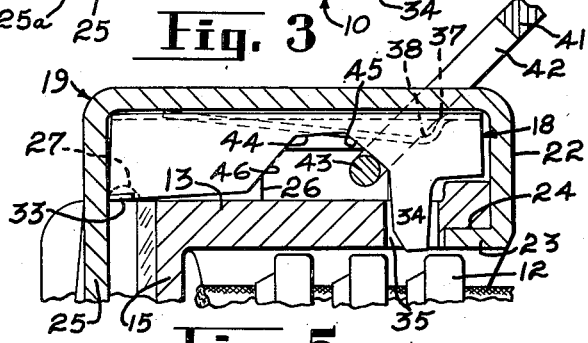
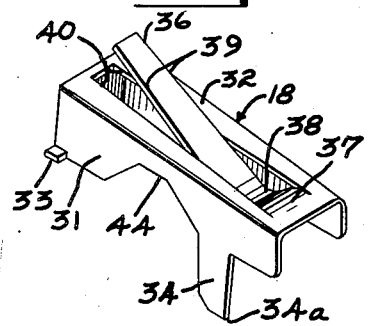
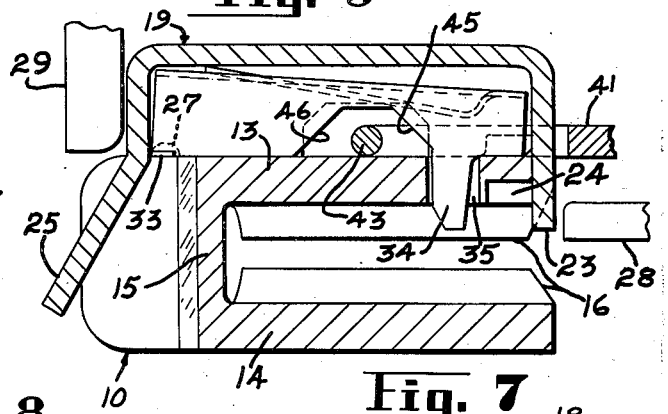
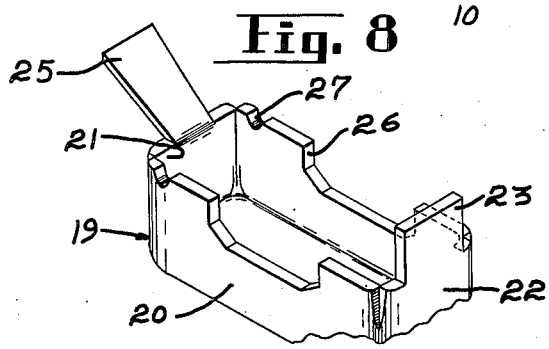
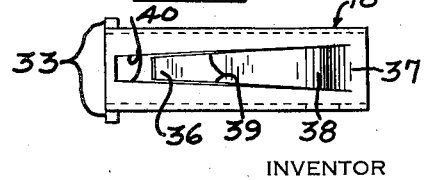
INVENTOR
Osborne Firing
BY
*H. F. Johnston*
ATTORNEY April 14, 1953  O. FIRING  2,634,485
AUTOMATIC LOCK SLIDER
Filed Jan. 19, 1950  2 SHEETS—SHEET 2
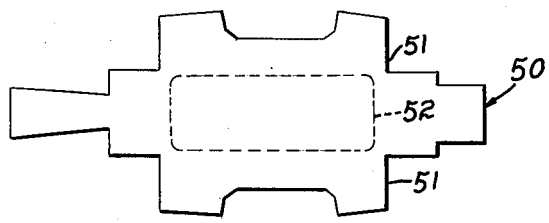
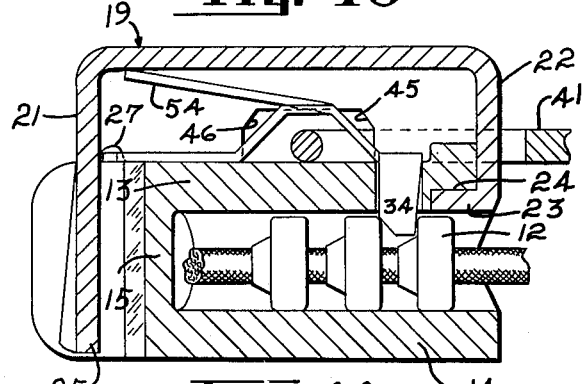
INVENTOR
Osborne Firing
BY H. F. Johnston
ATTORNEY Patented Apr. 14, 1953

2,634,485

UNITED STATES PATENT OFFICE 2,634,485

AUTOMATIC LOCK SLIDER

Osborne Firing, Woodbury, Conn., assignor to Scovill Manufacturing Company, Waterbury, Conn., a corporation of Connecticut Application January 19, 1950, Serial No. 139,332

10 Claims. (Cl. 24—205.14)

This invention relates to slide fasteners or zippers and particularly to automatic lock sliders for such fasteners, and to an improved method of making the same.

An object of this invention is to provide an improved locking device for preventing accidental movement of the slider along the fastener stringers, which shall be reliable in service and which will not be too expensive to manufacture.

Various types of locking sliders are manufactured to prevent the slider from slipping along the fastener elements and allowing the fastener to open up unintentionally. Some of these locking devices, such as pin locks or cam locks, require the pull tab to be pushed down against the slider in order to make the locking device effective. In many uses of zippers however, it is desirable that the locking device function automatically without requiring that the user push the pull tab down.

In one type of automatic locking device on the market, the locking prong is carried by a cap which is pivoted to the slider body. This cap is exposed and whenever it is subjected to pressure while the locking prong is resting against one of the fastener elements the locking prong is easily damaged. This often happens in laundering or pressing operations. Other types of automatic locking sliders have been proposed where the locking element is enclosed in a stationary cap but they have been either too expensive to manufacture, too bulky, or the locking element itself is too weak to stand up under severe pulling stresses on the fastener.

My invention provides a one-piece combined spring and locking element having great strength and housed and protected by a stationary cap member, and I have provided an ingenious and cheap method of assembling the cap with its enclosed locking element to the slider which is at the same time exceedingly strong. Furthermore, I have kept the bulk and particularly the overall height of the slider to a minimum by providing a spring element struck out from the material of the locking member and operating alongside or within the locking member instead of being interposed between the locking member and cap. I have at the same time improved the spring action of such sliders by utilizing a long spring tongue having the minimum of travel, thus providing a softer or easier spring action.

Another object is to provide an improved method and means for attaching the cap housing to the slider member which greatly simplifies the manner of assembling and securing the cap housing to the slider member.

Another object of the invention is to provide an improved combined spring and locking element which will have great strength and at the same time have a relatively soft or easy spring action.

The full nature of this invention, along with other objects and various advantages thereof will be more apparent from a consideration of the following description when read in connection with the accompanying drawing, in which:

Fig. 1 is a plan view of a part of a slide fastener showing the improved locking slider thereon.

Fig. 2 is a longitudinal cross-sectional view of the slider as it appears in locked position on the fastener elements.

Fig. 3 is a view similar to Fig. 2 but showing the slider in unlocked position.

Fig. 4 is a horizontal sectional view along line 4—4 of Fig. 2 showing how the cap housing is secured to the connecting neck.

Fig. 5 is a view similar to Fig. 2 showing my improved method of assembling the cap to the slider body.

Fig. 6 is a perspective view of the spring locking element.

Fig. 7 is a plan view of the same.

Fig. 8 is a perspective view of the cap housing as it appears in an inverted position.

Fig. 9 is a plan view of a sheet metal blank suitable for forming my improved cap housing.

Fig. 10 shows in longitudinal section my improved locking slider with a modified form of locking element, and Fig. 11 is a perspective view of the modified form of locking element itself.

The slider generally designated by the numeral 10 is adapted to operate along slide fastener stringers of any well known type comprising fabric tapes 11 having closely spaced fastener elements 12 attached to their adjacent beaded edges.

The slider 10 comprises front and back wings or plates 13 and 14 respectively, which are integrally connected together by a wedge-shaped hollow neck 15. The side edges of the plates 13 and 14 are formed with the usual inwardly directed flanges 16 for guiding the fastener elements into locked and unlocked relation.

The automatic locking feature in herein provided by a spring locking member 18 encased in a cap housing 19 bearing against the surface of the front plate 13. As best shown in Fig. 8 the cap housing 19 comprises an elongated cupped shell having side walls 20 and upper and lower end walls 21 and 22, respectively. The lower end wall 22 is provided with a depending catch lug 23 which in the course of assembly is bent at right angles to the wall 22 and received in a recess 24 provided in the inner face of front plate 13. Depending from the upper end wall 21 of the housing 19 is a dove-tail shaped tongue 25 which in its initial position before assembly is biased outwardly from the plane of said upper end wall 22. The side walls 20 of the cap housing 19 are each provided with elongated bail cutouts 26 and bearing recesses 27 for reasons which will appear later. The depth of the bail cutouts 26 is preferably approximately half the vertical extent of the side walls so as to retain sufficient strength in the central portion of the cap.

In making the assembly of the cap housing 19 to the front plate 13, the spring locking element 18 will first be positioned within the housing and then the latter will be placed with its open side resting against the surface of said front plate 13 in the manner shown in Fig. 5, i. e., with the catch lug 23 in a downward position and the tongue 25 biased outwardly. The permanent assembly is completed by causing a punch 28 (shown in dotted outline in Fig. 5) to move inwardly and bend the catch lug 23 into the recess 24. A vertical operating roller or punch 29 is also caused to descend and wipe against the biased tongue 25 forcing it inwardly into a recess 30 or channel provided in the neck 15. This recess 30 extends the entire depth from front to back of the slider 10 and opens toward the upper end of the slider. The side walls are parallel for a portion of the recess depth and taper toward each other at the bottom of the recess. The tongue 25 is long enough to extend substantially the entire length of the recess and is slightly wider than the recess especially at the wider part of the dovetail, so that when forced between the parallel walls of the recess, the edges of this tongue 25 will be distorted outwardly from their original plane into more or less fin-shaped edges 25a which will bite into the walls of said recess 30 for permanent assembly.

In order to provide maximum strength against crushing stresses and at the same time to keep the cost of manufacture to a minimum, my improved cap housing 19 is formed from a flat metal blank 50, as shown in Fig. 9, where the numerals indicate corresponding parts of the finished product. It will be noted in the blank that the sheared-out corners 51 do not extend all the way to the back wall portion indicated in dotted lines in Fig. 9 by the numeral 52. Then the cap can be formed from this blank 50 by pushing it into a drawing die where the sides and ends will be folded and drawn inwardly toward each other and the back wall will be arched into the side and end walls, which are themselves integrally joined together at their corners for a portion of their distance. The vertical extent of the unjoined portions of the corners is preferably greater than the vertical extent of the bail cutouts 26 in the side walls. This provides great strength against the tendency for the side and end walls to push out when a crushing stress is applied on the slider as in pressing operations. At the same time by cutting out the corner portions 51 there is not sufficient distortion of the side and end walls as to require an edge trimming operation as is necessary in the manufacture of a completely drawn cup-shaped shell.

The spring locking element 18, as best shown in Figs. 6 and 7, consists generally of a channel-shaped member having side walls 31 and a back wall 32. Each of the side walls 31 is formed with an outwardly and laterally projecting trunnion 33, which trunnions pivotally engage in the bearing recesses 27 of the cap housing 19 previously referred to. Also one of the side walls 31 is formed with a depending locking prong 34 that projects through an opening 35 in the front plate 13 to a position where the nose end 34a of the prong 34 will enter between a pair of fastener elements 12 on one of the tapes 11.

In order to urge the spring lock member 18 normally downwardly so that the locking prong 34 will engage between the fastener elements 12, an elongated spring tongue 36 is sheared out of the back wall 32 of the locking element 18. This tongue is preferably tapered in its longitudinal direction and has its point of attachment, as indicated at 37, adjacent that end of the member 18 from which the locking prong 34 depends. Adjacent its point of attachment, the tongue 36 is bent downwardly into a bowed section 38 while the major portion of the tongue is biased upwardly above the plane of the back wall 32. By bowing a portion of the tongue, as above described, the tapered tongue will shorten and the sheared side edges 39 of the tongue 36 will be removed from the sheared edges 40 of the back wall 32 so as to eliminate any frictional engagement between said tongue and said back wall and thus allowing for a free action of the spring tongue 36 into and out of the space from which it was originally struck out. It is to be noted from Fig. 6 that the spring tongue 36 extends a considerable distance above the back wall 32 of the locking member 18 and when said latter element is assembled into the cap housing 19 said tongue is forced inwardly within the back wall 32 and thereby building up a spring tensional effect in said tongue that will constantly urge said locking element 18 to pivot in a clockwise direction, as viewed in Figs. 2 and 3, within the cap housing 19, and dispose the locking prong 34 within the operating area of the fastener elements 12 passing through the slider. Because the bearing point of the tongue 18 is relatively close to the pivotal connecting of the locking member the spring travel is less and the action easier or softer than would be the case if the bearing point were adjacent the other end of the locking member. Also the channel shape of the locking member provides great strength to resist buckling stresses, in spite of the fact that the back wall is weakened by striking out the spring element.

In order to operate the slider 10 along the elements 12 on the tapes 11, a pull tab 41 is provided having bifurcated arms 42 straddling the cap housing 19, and which arms are integrally connected by a pivot axle 43 extending through the cutouts 26 in the cap housing 19 and similarly shaped cutouts 44 in the side walls of the locking member 18, the latter cutouts 44 being of less area than the housing cutouts 26 for reasons which will appear later.

In the operation of the locking slider 10 the pull tab 41 will be manually grasped and in normal usage swung to the position shown in Fig. 3. A pull is exerted thereon for drawing the slider in a direction to open the fastener. This position of and force on the pull tab 41 will first cause the axle 43 of the pull tab 41 to engage the inclined cam edges 45 of the side walls of the locking element cutouts 44 and swing the locking element 18 about the pivot trunnions 33 to disengage the locking prong 34 from the fastener elements 12. Any further movement will bring the pull tab axle 43 into contact with the cap housing cutouts 26 and thereby the main force exerted on the pull tab will be directed to the side walls of the cap housing 19 rather than on the spring member 18. In a similar manner when the pull tab is operated to close the fastener the axle 43 will engage the opposite inclined cam edges 46 of the cutouts 44 and cause the locking element to pivot and remove the locking prong 34 out of the path of the fastener elements 12 with the main force transmitted to the cap housing in operating the slider 10 in a reverse direction.

In Figs. 10 and 11, I have illustrated a modified form of combined locking member and spring useful wherever great strength is not required against buckling stresses of the locking member itself. This locking member 53 functions similarly to the locking member 18 and corresponding parts bear the same reference numerals. The spring locking tongue 54 is struck out from alongside a flat blank and bent upwardly into position where its end will bear against the cap 19. This element can be very easily made from a flat blank and with simpler forming operations than the locking element 18, but, of course, will not provide the strength resulting from the side walls of the locking element 18.

Two forms of the invention are presented herein for the purpose of exemplification, but it will be appreciated that the invention is susceptible of embodiment in other structurally modified forms coming equally within the scope of the appended claims.

I claim:

1. In a slide fastener, a pair of fastener stringers having rows of interlocking fastener elements attached thereto, a slider mounted on said rows of elements for engaging and disengaging the same and comprising front and back plates connected together at one end, the outer surface of said front plate being flat, a hollow cap housing fixed to the outer surface of said front plate, a locking member encased within said housing and extending substantially throughout the entire length of said housing and having one end pivotally connected to the side walls of said housing, the endwise movement of the locking member in either direction being prevented solely by the pivotal connection to said housing, the opposite end of said member having a prong projecting through an opening in the front plate and normally lying in the pathway of said fastener elements, and common means for operating said slider and removing said prong out of the pathway of said fastener elements.

2. A slider for slide fasteners comprising front and back plates integrally connected together by a neck, a hollow cap housing fixed to the outer surface of the front plate and having bearing recesses adjacent one end, a channel-shaped locking member with a back wall and side walls extending substantially throughout the entire length of said housing, pivot lugs extending laterally from said side walls into said bearing recesses, the endwise movement of the locking member in either direction being prevented solely by said pivot lugs and bearing recesses, one of the side walls at the opposite end of said member being extended to form a prong projecting through an opening in said front plate, an elongated spring tongue struck out from the back wall of said channel member and tensioned against said cover cap for normally urging said prong into engagement with said fastener elements, and common means for operating said slider and moving said prong to unlocked position.

3. A slider as defined by claim 2, wherein said spring tongue has its point of attachment adjacent that end of said locking member from which the prong projects.

4. A slider as defined by claim 2, wherein said spring tongue is sheared out of the back wall of said locking member and of tapered shape with the wider end at its point of attachment adjacent that end of said locking member from which the prong projects.

5. A slider as defined by claim 4, wherein the spring tongue adjacent its point of attachment is bowed downwardly into said channel-shaped member while its opposite free end is biased upwardly above the back wall of said member.

6. A slider for slide fasteners comprising front and back spaced plates integrally connected together by a hollow neck having a vertically extending channel within the body of the slider, which is open toward the upper end of the slider body, a cap housing having its open side resting against the front surface of said front plate, means for attaching said housing at its lower end to said front plate, and said upper end wall of said housing having a depending tongue the side edges of said tongue biting into the side walls of said neck channel to secure the upper end of said cap housing.

7. A slider as defined by claim 6, wherein the depending tongue is dovetail shaped and pressed firmly into the recess so that the side edges of the tongue bite into the side walls of the recess.

8. A slider for slide fasteners comprising a slider body having front and back plates connected together at one end, a hollow cap member attached to the front plate of the slider with its open side against the surface of the front plate, said hollow cap member having a back wall, side walls and end walls, said side walls having bail cutouts extending from the front plate approximately half the height of said side walls, the side and end walls being integrally joined at the corners of the cap for a portion only of their vertical depth and abutting but not integrally joined for the remainder of their depth, the vertical extent of the unjoined portions being greater than the vertical extent of said bail cutouts, and a locking element housed within said cap.

9. In the method of attaching a hollow cap member to a slider body wherein the slider body has a vertically extending hollow channel in the neck portion which opens toward the upper end of the slider, which channel has side walls which are substantially parallel adjacent the entrance to the channel, and wherein the cap member is provided with a tongue substantially as long as the vertical dimension of the channel and which tongue is slightly wider than the distance between the side walls of the channel, placing the cap against the front plate of the slider with the tongue in said channel but biased outwardly at an angle, and then bending said tongue and forcing it into the channel whereupon the side edges of the tongue bite into said side walls of the channel.

10. The method defined in the preceding claim wherein said tongue is of dovetail shape with its wider part at the free end and where the tongue is moved into place by a tool operating progressively toward the wide end of the tongue.

OSBORNE FIRING.

References Cited in the file of this patent

UNITED STATES PATENTS

| Number | Name | Date |
|---|---|---|
| 2,025,693 | Poux | Dec. 24, 1935 |
| 2,057,126 | Wintritz | Oct. 13, 1936 |
| 2,271,141 | Lange | Jan. 27, 1942 |
| 2,299,133 | Epes | Oct. 20, 1942 |
| 2,511,491 | Brown | June 13, 1950 |
| 2,519,494 | Negrich | Aug. 22, 1950 |

FOREIGN PATENTS

| Number | Country | Date |
|---|---|---|
| 211,641 | Switzerland | of 1940 |
| 512,643 | Great Britain | of 1939 |